Aug. 5, 1930.　　　　L. DUNNING　　　　1,772,389
RECOIL CHECK, ETC
Filed Feb. 13, 1924　　　3 Sheets-Sheet 1
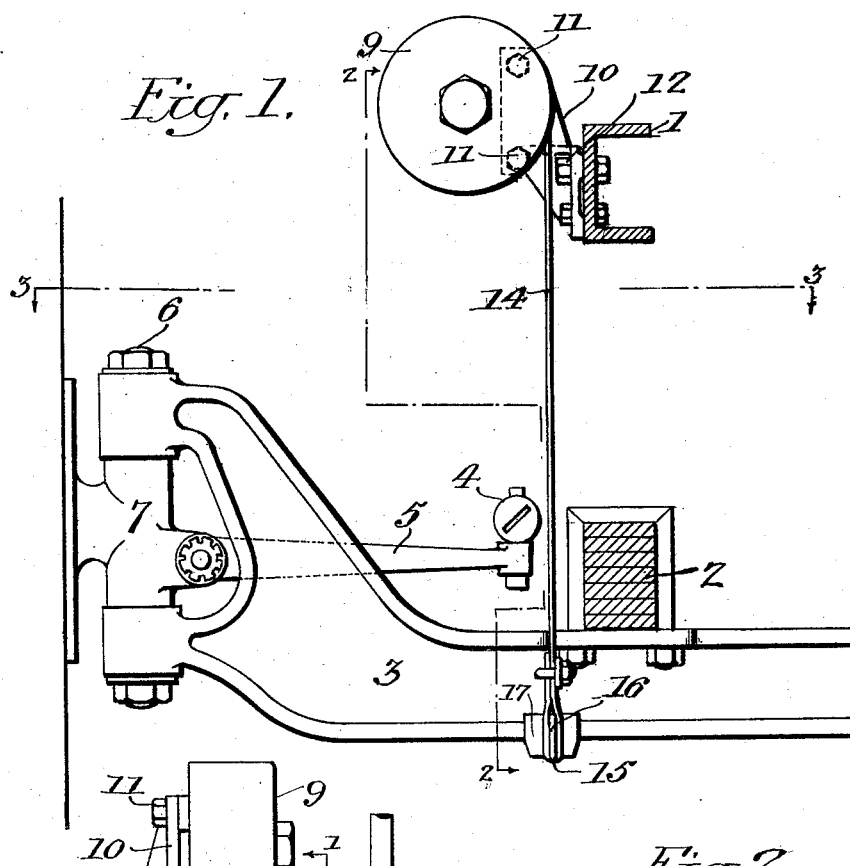
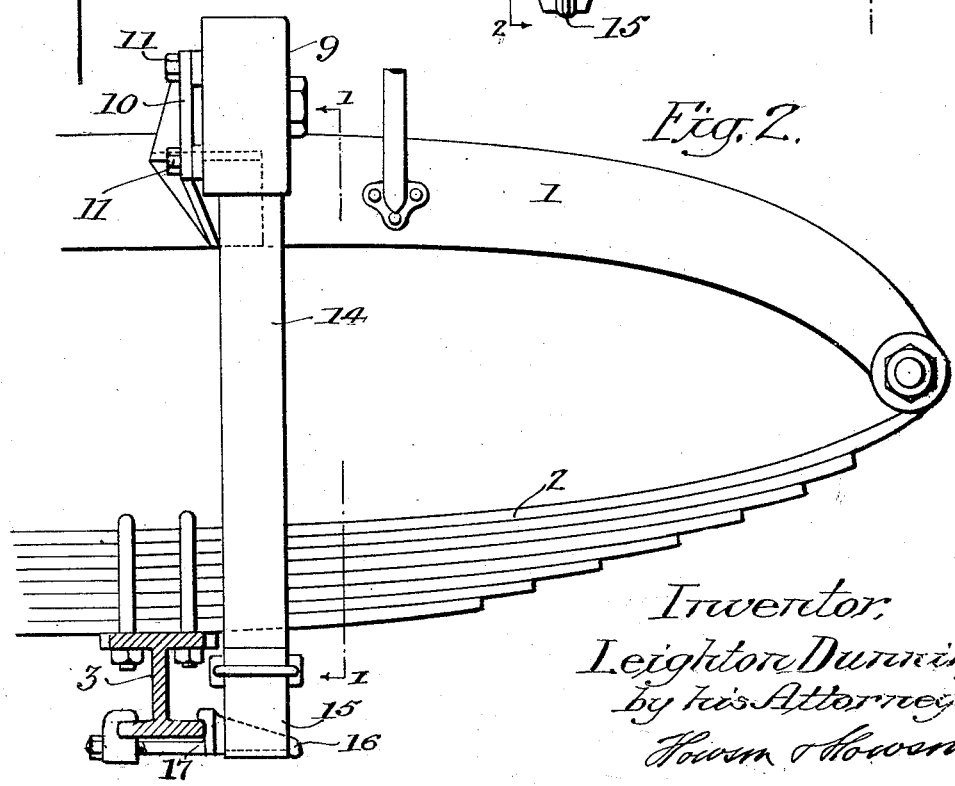
Inventor,
Leighton Dunning,
by his Attorneys

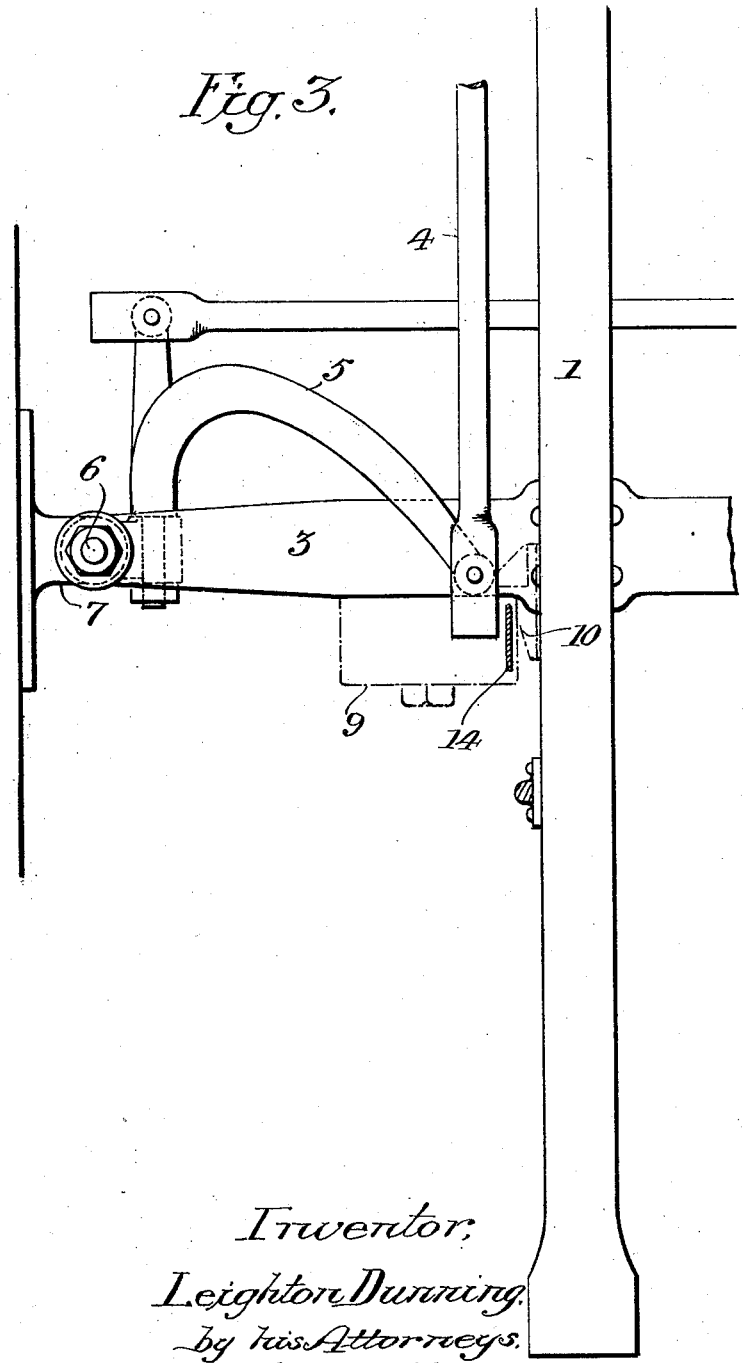

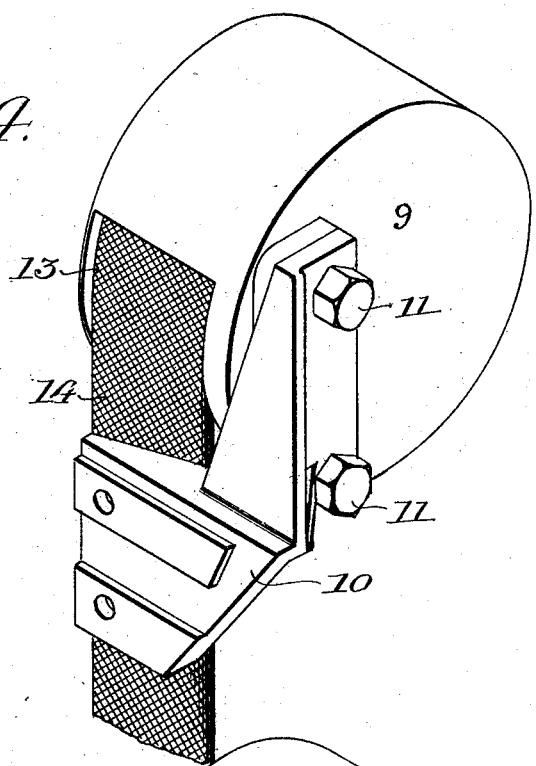
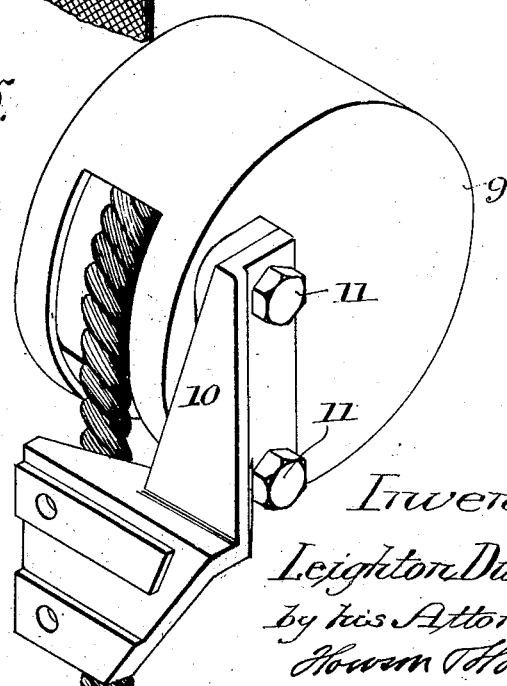

Patented Aug. 5, 1930

1,772,389

UNITED STATES PATENT OFFICE

LEIGHTON DUNNING, OF DETROIT, MICHIGAN, ASSIGNOR TO JOHN WARREN WATSON COMPANY, OF PHILADELPHIA, PENNSYLVANIA, A CORPORATION OF PENNSYLVANIA

RECOIL CHECK, ETC.

Application filed February 13, 1924. Serial No. 692,591.

My invention relates to certain improvements in the mounting and installation arrangement of recoil check devices used for controlling the springs of vehicles, particularly motor vehicles. The invention is particularly applicable to recoil check devices of the type wherein a flexible tension member extends from one side of the device and is adapted to be secured to the vehicle axle.

The principal object of the invention is to provide an arrangement and mounting for the recoil check device which makes it possible for the flexible tension member or strap to be located very close to the side rail of the vehicle frame whereby the twisting effect upon the side rail is reduced to a minimum.

A further object of the invention is to provide an arrangement and mounting which is such that the major dimension of the recoil check device extends transversely thus permitting the device to be mounted on the side rail of the vehicle frame at the most effective position without interfering with fender irons or other parts of the car. This makes it possible for the device to be located substantially vertically above the axle, thus avoiding the use of long brackets projecting from the axle for the attachment of the flexible member and also avoiding the location of the device in such a position that the tension member is at an angle instead of being vertical.

The invention also relates to certain details of construction which will be described hereafter.

In mounting devices of the above mentioned type, it has heretofore been the custom to mount the device itself with its face or side parallel to, or flat against the side rail of the vehicle, and with the axis extending transversely. The result was that the strap or cable connecting it to the axle stood at some little distance from the side rail.

The above customary form of mounting has a disadvantage in that, due to the strap or cable being at some little distance from the rail, it imparts to the side rail a rather heavy twisting action. Also due to the construction of certain automobiles, a construction wherein the steering drag link is located very close to the side of the spring, it is necessary in the above mentioned customary type of mounting to place the device with its strap or cable quite far forward of the axle in order that the steering drag link may be moved into its extreme forward position without striking the strap or cable.

In order that the strap or cable may operate in a substantially vertical plane, this forward mounting makes necessary the use of a rather long bracket arm extending forward from the axle to hold the strap or cable. This arrangement is undesirable as it is best that the pull of the strap be as near as possible to the axle.

In the construction of still other motor vehicles having the steering drag link close up to the car spring, it is necessary to mount the device still further forward along the car frame in order to avoid fender irons or other car mountings, and in any of these instances where the instrument must be mounted well forward on the side rail of the vehicle there is generally found serious interference with bumper mountings, etc., and frequently also the turning radius of the steering wheels must be reduced to avoid interference with the device.

To overcome all these and other objections to the customary parallel mounting of these recoil checks or shock absorbers, the present invention, as will be seen by the accompanying drawings, utilizes a mounting which holds the face of the device at right angles to the side rail with the axis extending longitudinally. This form of mounting permits the strap or cable to be run very close to the side rail of the vehicle. This results in a lessened twisting strain upon the frame and also holds the strap flatwise to the car spring, which permits of it passing between the spring of the vehicle and the steering drag link, even though those members are located very close together. With the device mounted as described it occupies but very little space in the longitudinal direction along the side rail and it is therefore close to a point directly over the car axle and thus out of the way of fender irons, bumpers and other fixtures.

This form of mounting at once overcomes all of the many disadvantages found in the customary form of mounting and is of great commercial value because, in addition to overcoming the above drawbacks of the customary mountings, fewer varieties of fittings are required to fit a great number of different automobiles. The value of standardization of parts is well recognized in both manufacturing and merchandising.

In the accompanying drawings:

Fig. 1 is a sectional view on the line 1—1, Fig. 2, illustrating my invention;

Fig. 2 is a sectional view on the line 2—2, Fig. 1;

Fig. 3 is a sectional view on the line 3—3, Fig. 1;

Fig. 4 is a perspective view of a recoil check, having a flat strap and illustrating one form of attachment by which it is secured to the frame of a vehicle; and, Fig. 5 is a perspective view illustrating a recoil check using a cable.

Referring to the drawings, 1 is one of the side rails of a frame of an automobile. 2 is a front spring longitudinally arranged, which is secured to the front axle 3 and attached to the rail in the usual manner. 4 is the steering drag link and 5 is the knuckle arm by which the link is connected to the mechanism by which the front wheels are turned on the king bolts 6, one of which is shown in the drawings. This knuckle arm is of such a length and is so shaped in many types of automobiles that it extends close to the spring of the vehicle so that any of the present types of recoil checks, or shock absorbers, if properly installed with the strap or cable held substantially vertical, interfere with the movement of the steering mechanism unless placed at a considerable distance in front of the axle, which is objectionable.

7 designates the steering knuckle, which is mounted on a king bolt 6 and to which the knuckle arm 5 is attached. 9 designates the casing of a recoil check device which is of the type already referred to. 10 designates the bracket by which the casing is attached to the side of the side rail 1. This bracket is made as shown clearly in Fig. 4 having a clamping face substantially parallel with the axis of the recoil check. Two bolts 11 secure the bracket to the casing 9 and bolts 12 secure the bracket to the side frame. The design of this bracket depends considerably upon the design of the vehicle to which the invention is applied, and upon the particular recoil check device employed.

The casing 9 has an opening in its periphery, as at 13, Fig. 4, for the passage of the connecting strap 14. This opening is at the bracket side of the casing. The strap is flat, in the present instance, and is looped at its lower end, as at 15. An arm 16 on a clamp plate 17 extends through the loop. This clamp plate is attached to the axle as shown clearly in Fig. 2. This clamp, however, may be modified without departing from the essential features of the invention.

The details of the recoil check have not been described, as they form no part of the present invention. The invention can be used in connection with any desired recoil check device of the type described.

While one form of installation arrangement is shown embodying my invention, it will be understood that any variety of means may be employed for holding the face of the device at right angles to the side rail, or for holding the strap flatwise to the frame and spring of the vehicle without departing from the spirit of the invention which has for its main object to hold the strap or cable as near as possible to the vehicle frame, and in the case of the strap, to hold the strap flat or parallel to the spring of the vehicle, so that it can pass freely between the spring and the steering drag link, even in cases where those two members extend very close to each other.

I claim:

1. A recoil controlling mechanism adapted for attachment to the side frame of a motor vehicle and including a flexible actuating member adapted for attachment to the axle of said vehicle, and means for securing the said mechanism to said side frame so that said flexible member in passing to the said axle extends downwardly between the said mechanism and said side frame.

2. A device for checking the recoil of a vehicle spring embodying a flexible tension member extending therefrom and adapted to be connected to the vehicle axle, in combination with means for attaching the said device to the side rail of a vehicle frame in such position that the side of the device from which the flexible member extends is facing the side rail.

3. A device for checking the recoil of a vehicle spring embodying a flexible flat tension strap extending from one side thereof and adapted to be connected to the vehicle axle, in combination with means for attaching the said device to the side rail of a vehicle frame with the aforesaid side thereof positioned facing the rail and with the plane of the strap parallel with the rail, the said side rail of said vehicle frame being supported at two points by a vehicle spring, and said attachment to be made between said points of spring support.

4. The combination of the side rail of a vehicle frame; a vehicle axle; a spring attached to said axle and supporting said side rail; a steering drag link substantially paralleling said spring and said side rail; a recoil check of rotary type secured to said side rail so that the axis of rotation is substantially parallel to the longitudinal line of said side rail; and a flexible member extending from the recoil check and attached to said axle, said flexible member passing between said spring and said steering drag link.

5. The combination of the side rail of a vehicle frame; a vehicle axle; a vehicle spring attached to said axle and supporting, and substantially paralleling, said side rail; a recoil check of rotary type secured to said side rail so that the axis of rotation is substantially parallel to the longitudinal line of said side rail; and a flexible member extending down to said axle from the side of the recoil check nearest said side rail.

LEIGHTON DUNNING.